United States Patent
Doumen et al.

(10) Patent No.: US 12,231,988 B2
(45) Date of Patent: Feb. 18, 2025

(54) TRAFFIC AMOUNT ESTIMATION SYSTEM

(71) Applicant: NTT DOCOMO, INC., Chiyoda-ku (JP)

(72) Inventors: Takuya Doumen, Chiyoda-ku (JP); Tomohiro Nakagawa, Chiyoda-ku (JP); Kazuya Sasaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 320 days.

(21) Appl. No.: 17/610,559

(22) PCT Filed: Apr. 17, 2020

(86) PCT No.: PCT/JP2020/016940
§ 371 (c)(1),
(2) Date: Nov. 11, 2021

(87) PCT Pub. No.: WO2020/230524
PCT Pub. Date: Nov. 19, 2020

(65) Prior Publication Data
US 2022/0232348 A1     Jul. 21, 2022

(30) Foreign Application Priority Data
May 15, 2019  (JP) .................... 2019-092250

(51) Int. Cl.
*H04W 4/029*  (2018.01)
*G06Q 30/0201* (2023.01)
*H04W 4/02*  (2018.01)

(52) U.S. Cl.
CPC ........... *H04W 4/029* (2018.02); *H04W 4/023* (2013.01); *G06Q 30/0201* (2013.01)

(58) Field of Classification Search
CPC ..... H04W 4/029; H04W 4/023; H04W 4/027; H04W 4/026; H04W 4/021; G06Q 30/0201; G06Q 30/02; G08G 1/00
See application file for complete search history.

(56) References Cited

U.S. PATENT DOCUMENTS 9,493,195 B1 * 11/2016 Willis .................. B62D 53/067
10,609,541 B1 *  3/2020 Govindassamy . H04M 1/72418
(Continued)

FOREIGN PATENT DOCUMENTS

JP      2005215909 A  *  8/2005
JP      2007178344 A  *  7/2007
(Continued)

OTHER PUBLICATIONS

L. Pun, P. Zhao and X. Liu, "A Multiple Regression Approach for Traffic Flow Estimation," in IEEE Access, vol. 7, pp. 35998-36009, Mar. 12, 2019 (Year: 2019).*
(Continued)

*Primary Examiner* — Yuwen Pan
*Assistant Examiner* — Swati Jain
(74) *Attorney, Agent, or Firm* — Oblon, McClelland, Maier & Neustadt, L.L.P.

(57) ABSTRACT

A traffic amount estimation system is a traffic amount estimation system that estimates a traffic amount of people in a predetermined time frame in an area that is an estimation target set in advance, the traffic amount estimation system including: a population information acquiring unit configured to acquire population information representing a population at a predetermined timing in the area that is the estimation target; a movement state information acquiring unit configured to acquire movement state information representing a movement state of each of a plurality of people in the area that is the estimation target; and an estimation
(Continued)

unit configured to group the movement state information in accordance with moving directions represented by the movement state information and estimate the traffic amount on the basis of the grouped movement state information and the population information.

2 Claims, 7 Drawing Sheets

(56) References Cited

U.S. PATENT DOCUMENTS

| | | | | |
|---|---|---|---|---|
| 11,333,508 | B2* | 5/2022 | Kitamura | G06Q 10/063 |
| 2002/0082766 | A1* | 6/2002 | Ormson | G08G 1/0104 |
| | | | | 455/456.3 |
| 2007/0208494 | A1* | 9/2007 | Chapman | G08G 1/0104 |
| | | | | 701/117 |
| 2012/0115505 | A1* | 5/2012 | Miyake | H04W 4/027 |
| | | | | 455/456.1 |
| 2016/0358190 | A1* | 12/2016 | Terrazas | G06F 18/22 |
| 2017/0235848 | A1* | 8/2017 | Van Dusen | G06Q 30/0201 |
| | | | | 705/12 |
| 2019/0019405 | A1* | 1/2019 | Lim | G08G 1/0125 |
| 2019/0028852 | A1* | 1/2019 | Yamada | H04W 4/029 |
| 2022/0221287 | A1* | 7/2022 | Akagi | H04W 4/029 |

FOREIGN PATENT DOCUMENTS

| | | | | |
|---|---|---|---|---|
| JP | 4800500 B2 | * | 10/2011 | |
| JP | 2018018210 A | * | 2/2018 | ............... G08G 1/00 |
| JP | 2019-28526 A | | 2/2019 | |
| JP | 2019028526 A | * | 2/2019 | |
| WO | WO 2010/119948 A1 | | 10/2010 | |
| WO | WO 2018/021186 A1 | | 2/2018 | |

OTHER PUBLICATIONS

Japanese Office Action issued Aug. 22, 2023 in Japanese Application 2021-519321, (with unedited computer-generated English translation), 11 pages.

English translation of International Preliminary Report on Patentability and Written Opinion issued Nov. 25, 2021 in PCT/JP2020/016940, 6 pages.

International Search Report issued on Jul. 21, 2020 in PCT/JP2020/016940 filed on Apr. 17, 2020, 2 pages.

Japanese Office Action issued Feb. 27, 2024 in Japanese Patent Application No. 2021-519321 (with unedited computer-generated English translation), 7 pages.

Office Action issued Nov. 21, 2023, in corresponding Japanese Patent Application No. 2021-519321 (with English Translation), 10 pages.

* cited by examiner

| CLIENT | SPEED [m/s] | DIRECTION (DIRECTION ANGLE) | 1/MOVEMENT NUMBER [PERSON] |
|---|---|---|---|
| A | 0.2 | 67° | 0.333 |
| A | 0.1 | 72° | 0.333 |
| A | 0.3 | 12° | 0.333 |
| B | 2.1 | -175° | 1.0 |
| C | 0.6 | -125° | 0.50 |
| C | ... | ... | 0.50 |
| ... | ... | ... | 0... |

Fig.5

TRAFFIC AMOUNT ESTIMATION SYSTEM

TECHNICAL FIELD

The present invention relates to a traffic amount estimation system that estimates the traffic amount of people in an estimation target area.

BACKGROUND ART

Conventionally, it has been proposed to acquire location information representing locations of mobile terminals and analyze a population distribution of users of the mobile terminals on the basis of the acquired location information (for example, see Patent Literature 1).

CITATION LIST

Patent Literature

[Patent Literature 1] PCT International Publication No. 2010/119948

SUMMARY OF INVENTION

Technical Problem

When an advertising space of an advertisement posted at an outdoor place is to be sold, it is important how many people will see the advertisement. For example, as one index thereof, using the number of people that have passed through an area in which an advertisement is viewed may be considered. Using the location information described above in estimating the amount of passage of people in an area may be considered. However, in estimating the amount of traffic in a predetermined time frame only on the basis of location information, it is necessary to continue to acquire the location information of all the people present in the vicinity of the area over the predetermined time frame. It is difficult to acquire location information in this way.

One embodiment of the present invention has been made in view of the description presented above, and an object thereof is to provide a traffic amount estimation system capable of easily and appropriately estimating the traffic amount of people in an area.

Solution to Problem

In order to achieve the object described above, a traffic amount estimation system according to one embodiment of the present invention is a traffic amount estimation system that estimates a traffic amount of people in a predetermined time frame in an area that is an estimation target set in advance, the traffic amount estimation system including: a population information acquiring unit configured to acquire population information representing a population at a predetermined timing in the area that is the estimation target; a movement state information acquiring unit configured to acquire movement state information representing a movement state of each of a plurality of people in the area that is the estimation target; and an estimation unit configured to group the movement state information acquired by the movement state information acquiring unit in accordance with moving directions represented by the movement state information and estimate the traffic amount on the basis of the grouped movement state information and the population information acquired by the population information acquiring unit.

According to a traffic amount estimation system of one embodiment of the present invention, for example, a traffic amount can be estimated without performing counting of a traffic amount at a specific place on a passage road, acquisition of location information of all the people over all the time frame for estimation in an area that is an estimation target, and the like. In other words, according to the traffic amount estimation system of one embodiment of the present invention, a traffic amount can be estimated easily and appropriately.

Advantageous Effects of Invention

According to one embodiment of the present invention, a traffic amount can be estimated easily and appropriately.

BRIEF DESCRIPTION OF DRAWINGS

FIG. 2 is a diagram illustrating an example of an area that is an estimation target.

FIG. 3 is a diagram illustrating an example of movement state information.

FIG. 5 is a diagram illustrating the number of mesh cells traversing an area that is an estimation target.

DESCRIPTION OF EMBODIMENTS

Hereinafter, an embodiment of a traffic amount estimation system according to the present invention will be described in detail with reference to the drawings. In description of the drawings, the same reference signs will be assigned to the same elements, and duplicate description thereof will be omitted.

Figure 1:
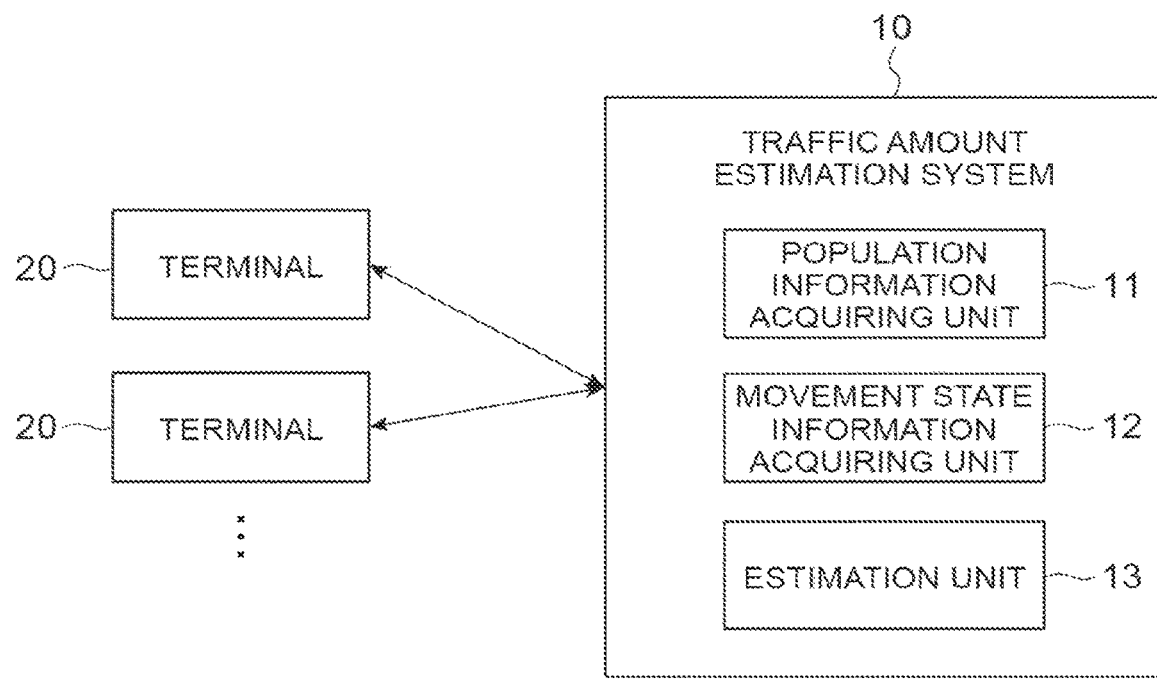
FIG. 1 is a diagram illustrating the configuration of a traffic amount estimation system according to an embodiment of the present invention.

FIG. 1 illustrates a traffic amount estimation system 10 according to this embodiment. The traffic amount estimation system 10 is a system (device) that estimates (assumes or calculates) a traffic amount (an amount of passage) of people in a predetermined time frame in an area that is an estimation target set in advance. For example, a traffic amount estimated by the traffic amount estimation system 10 is used for evaluating an advertising space of an advertisement posted at an outdoor place. An area that is an estimation target is an area of a passage road or the like in which an advertising space of a specific position can be seen. An advertisement posted at an outdoor place is posted on a building or the like on the street and is referred to by passengers. A value of an advertising space is determined on the basis of the number of people who can refer to the advertisement, in other words, a traffic amount of the area. For example, the traffic amount estimation system 10 estimates a traffic amount of people in units of one hour (for example, 13:00 to 14:00) at a predetermined timing.

In addition, in the description presented above, although an advertisement is assumed to be posted visually, the advertisement may be posted using sounds. In such a case, an area that is an estimation target may be an area in which an advertisement that is audibly output from a specific position can be heard.

For example, the traffic amount estimation system 10 is realized by a server apparatus. In addition, the traffic amount estimation system 10 may be realized by a plurality of server apparatuses, in other words, computer systems. The traffic amount estimation system 10 receives information transmitted from a terminal 20 and estimates a traffic amount on the basis of the received information.

The terminal 20 is a device that is held (carried) and used by an individual user. More specifically, the terminal 20 is a mobile phone, a smartphone, or the like. The terminal 20 has a function of performing radio communication by being connected to a network such as a mobile communication network. The terminal 20 and the traffic amount estimation system 10 can perform communication through a network and are configured to perform transmission/reception of information to/from each other.

The terminal 20 has a positioning function of its own terminal 20 such as a Global Positioning System (GPS) positioning function and acquires location information representing a location of the own terminal 20. For example, the acquired location information is information that represents latitude and longitude of the location of the own terminal 20. The location information may be information rather than the latitude and longitude. In addition, the positioning using the terminal 20 may be performed using a conventional method using a wireless LAN (for example, Wi-Fi (registered trademark)) or radio waves such as beacons or a conventional method using radio waves of a mobile phone base station in addition to the GPS positioning. The location information is configured such that the traffic amount estimation system 10 side can perceive which terminal 20 performs positioning at which time. The terminal 20 continuously perform positioning of its own terminal 20. For example, the terminal 20 performs positioning of its own terminal 20 every five minutes. Thus, the location information is information of a time series. The terminal 20 transmits the acquired location information to the traffic amount estimation system 10. For example, at a time set in advance once a day (for example, 0:00), the terminal 20 collects location information acquired by then and transmits the location information to the traffic amount estimation system 10.

In addition, all the terminals 20 carried by users passing through an area that is an estimation target do not need to transmit location information to the traffic amount estimation system 10, and terminals 20 of a predetermined number of users among the users may transmit location information to the traffic amount estimation system 10. For example, terminals 20 in which an application used for providing location information for the traffic amount estimation system 10 is installed may transmit location information. The predetermined number described above may be a number with which estimation of a traffic amount to be described below can be appropriately performed.

Next, the function of the traffic amount estimation system 10 according to this embodiment will be described. As illustrated in FIG. 1, the traffic amount estimation system 10 includes a population information acquiring unit 11, a movement state information acquiring unit 12, and an estimation unit 13.

Figure 2:
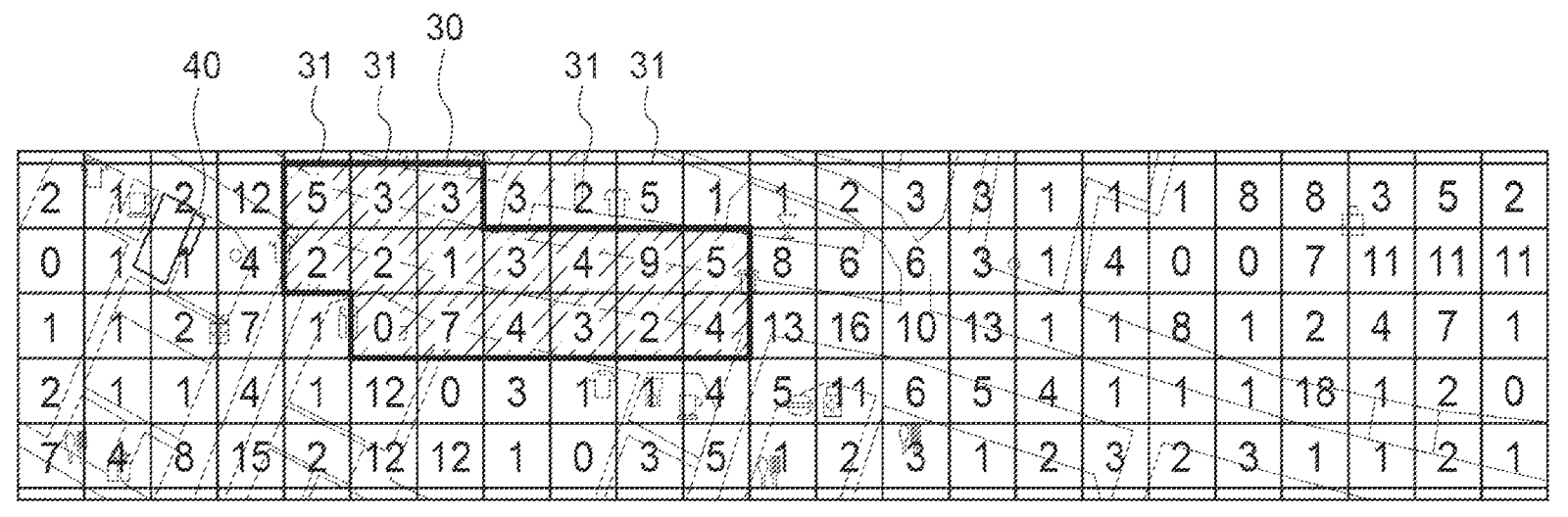

The population information acquiring unit 11 is a functional unit that acquires population information representing a population at a predetermined timing in an area that is an estimation target. Here, an area that is an estimation target will be described. In this embodiment, as illustrated in FIG. 2, an area 30 that is an estimation target is composed of a plurality of mesh cells 31. The mesh cells 31 are obtained by dividing a region including the area 30, which is an estimation target, into rectangles. A size of a mesh cell 31 is set in advance and, for example, is a square of which the length of one side is 7 m. In addition, the size of the mesh cell 31 may be a square of which the length of one side is 15 m or 30 m. The size of the mesh cell 31 may be a unit in which population information can be acquired.

The area 30 that is an estimation target is an area in which a person can see the position of the advertising space 40 disposed in a building or the like on the street in a case in which the person is located in the area. In other words, the area 30 that is an estimation target is a view area in which an advertisement posted in the advertising space 40 is seen or heard. In addition, an advertisement being seen does not mean that the location is physically seen, but may also mean that the advertisement is able to be appropriately recognized. The area 30 that is an estimation target is set by designating mesh cells 31 in which the position of the advertising space 40 is seen in advance. The setting of the area 30 that is an estimation target is performed by a manager or the like of the area 30 that is the estimation target in advance. The traffic amount estimation system 10 stores the area 30 that is an estimation target in advance. In addition, the area that is an estimation target and an area relating to population information may not be in units of the mesh cells 31 but may be an area having an arbitrary shape and an arbitrary size.

For example, the population information according to this embodiment is information represented by the number of people (population) who are present in the mesh cells 31 composing the area 30 that is an estimation target at a specific timing set in advance.

Numbers written in the mesh cells 31 illustrated in FIG. 2 represent populations of the mesh cells 31. The population information is represented by a population distribution of the mesh cells 31 composing the area 30 that is an estimation target. The specific timing set in advance may be a timing corresponding to a time frame for which a traffic amount of people is estimated. For example, in a case in which a traffic amount of 13:00 to 14:00 is estimated, the timing is 13:00. The timing relating to population information may not be a timing corresponding to a time frame for which a traffic amount of people is estimated.

Data of a population distribution for each mesh 31 at a specific timing can be generated using a conventional method, for example, a method using a base station signal or GPS. For example, the data of the population distribution may be generated on the basis of the location information of terminals held (carried) by users. In addition, when data of a population distribution is generated, comprehensive data using location information of more terminals than terminals used at the time of estimating a traffic amount may be generated. In addition, the data of a population distribution does not need to be data of a day that is a target for estimating a traffic amount and may be data generated at the same timing on a previous day (for example, 13:00 described above).

In other words, the population information may be prepared in advance at a timing that is a target for estimating a traffic amount. In addition, for example, the data may be data of an average of the past one month or the like. The population information acquiring unit 11 may calculate a population distribution for each mesh cell.

For example, the population information acquiring unit 11 stores data of a population distribution for each mesh cell 31 prepared in advance and takes a sum of populations of mesh cells 31 composing the area 30 that is an estimation target, thereby acquiring population information relating to a predetermined timing for the area 30 that is the estimation target. For example, in the example illustrated in FIG. 2, a sum of populations of all the mesh cells 31 composing the area 30 that is an estimation target is taken, and information of 57 persons is acquired as population information. The population information acquiring unit 11 outputs the acquired population information to the estimation unit 13. In addition, the population information acquiring unit 11 may acquire population information using an arbitrary method instead of the method described above.

In this embodiment, it is assumed that people corresponding to the number of people represented in the population information are located inside an area 30 that is an estimation target over a time frame (for example, 13:00 to 14:00) for which a traffic amount of people is estimated. In other words, although people located in the area 30 that is an estimation target change in accordance with movement, it is assumed that the number of people located inside the area 30 that is the estimation target is maintained to be the number of people represented in the population information. On the basis of this assumption, in this embodiment, a traffic amount is estimated on the basis of the following considerations.

A switching frequency of people of the area 30 that is the estimation target can be calculated on the basis of moving speeds of the people located inside the area 30 that is the estimation target and a size of the area 30. For example, it is assumed that all the people of the area 30 that is the estimation target are moving at 0.5 m/s. In addition, for example, it is assumed that a length of the area 30 that is an estimation target in the moving direction of people is 7 mesh cells×7 m (49 m) that is a longest length of the area 30 that is the estimation target illustrated in FIG. 2 in a horizontal direction. In this case, a passage time of people located in the area 30 that is the estimation target is 98 s. A traffic amount per hour with traffics (interchange) of people taken into account is 3600/98×57≈2,094 persons.

The movement state information acquiring unit 12 is a functional unit that acquires movement state information representing a movement state of each of a plurality of people in the area 30 that is an estimation target. The movement state information acquiring unit 12 acquires location information representing a location of each of a plurality of people and calculates a movement direction and a moving speed as movement state information on the basis of the location information. More specifically, the movement state information acquiring unit 12 acquires the movement state information as below.

The movement state information acquiring unit 12 receives location information transmitted from the terminal 20 as location information representing a location of a user holding the terminal 20. A plurality of terminals 20 transmit location information to the traffic amount estimation system 10. Thus, the movement state information acquiring unit 12 receives location information of the plurality of users. The movement state information acquiring unit 12 determines whether or not location information received for each user is used for estimating a traffic amount. The location information used for estimating a traffic amount represents a movement state of users (people) in the area 30 that is an estimation target. The determination is performed on the basis of the area 30 that is the estimation target.

For example, the movement state information acquiring unit 12 extracts only location information relating to a time frame that is an estimation target for a traffic amount from the received location information and performs determination described below for the extracted location information. The movement state information acquiring unit 12 determines that location information is used for estimating a traffic amount in a case in which a location represented by the location information is included in the area 30 that is an estimation target or in the vicinity thereof and determines that location information is not used for estimating a traffic amount in a case in which a location represented by the location information is not included in the area 30 that is an estimation target or in the vicinity thereof. The vicinity of the area 30 that is the estimation target is set in advance. The vicinity of the area 30 that is the estimation target is a range in which a location of the vicinity represents movement states of users in the area 30 that is the estimation target. For example, the vicinity of the area 30 that is an estimation target is a range of 1 to 2 mesh cells 31 on the outer side of the area 30 that is the estimation target. The determination on whether or not location information is used for estimating a traffic amount may be performed using a method other than that described above. For example, the movement state information acquiring unit 12 may determine that location information for which a location represented by the location information is included in the area 30 that is an estimation target and location information that is before and after the location information in time are used for estimating a traffic amount.

The movement state information acquiring unit 12 calculates a movement direction and a moving speed on the basis of the location information determined to be used for estimating a traffic amount as movement state information. The movement state information acquiring unit 12 calculates a movement direction and a moving speed on the basis of two consecutive locations (for example, locations having an interval of five minutes in a case in which positioning is performed at the interval of five minutes) and a time interval therebetween for the same user represented by the location information. The movement state information acquiring unit 12 calculates a moving speed and a movement direction for each segment (edge) joining two consecutive points. The movement state information acquiring unit 12, for example, calculates a moving speed as a numerical value in the unit of [m/s]. The movement state information acquiring unit 12, for example, calculates a movement direction as a numerical value representing an azimuth angle. The numerical value representing an azimuth angle, for example, is calculated as an angle with respect to a specific direction set in advance. In this embodiment, an angle from the north direction to the east direction is defined as a positive angle, an angle from the north direction to the west direction is defined as a negative angle, and a movement direction is represented using a value in the range of −180 ° to +180 °.

In addition, the movement state information acquiring unit 12 calculates a reciprocal of the number of edges for each user (client). The reciprocal of the number of edges is a value that becomes a weighting factor of an edge between users in estimating a traffic amount. For a user having many edges, the weighting factor per edge decreases, and for a user having few edges, the weighting factor per edge increases. The movement state information calculated by the movement state information acquiring unit 12 is information as illustrated in FIG. 3. As illustrated in FIG. 3, one piece of data of the movement state information is data in which a user (client), a moving speed [m/s], a movement direction (azimuth angle), and 1/the number of movements (a reciprocal of the number of edges) are associated with each other. The movement state information acquiring unit 12 outputs the calculated movement state information to the estimation unit 13.

The estimation unit 13 is a functional unit that groups the movement state information acquired by the movement state information acquiring unit 12 in accordance with movement directions represented by the movement state information and estimates a traffic amount on the basis of the grouped movement state information and the population information acquired by the population information acquiring unit 11. The estimation unit 13 estimates a traffic amount by multiplying a population number represented by the population information by a parameter according to a frequency of people for each movement state for each group. The estimation unit 13 estimates a traffic amount by multiplying the population number by a parameter according to the movement direction of the area 30 that is an estimation target. More specifically, the movement state information acquiring unit 12 estimates a traffic amount as below.

The estimation unit 13 receives population information from the population information acquiring unit 11 as an input. The estimation unit 13 receives movement state information from the movement state information acquiring unit 12 as an input. The estimation unit 13 performs clustering of movement directions represented by the movement state information. The clustering can be performed using an arbitrary conventional method such as a k-means method. For example, the movement directions are clustered into four direction clusters through clustering. The estimation unit 13 groups movement state information into the clustered direction clusters. The estimation unit 13, for each direction cluster, takes a sum of "1/the number of movements" for each division of the moving speed (a speed bin) represented by the movement state information. The speed bins are set in advance and, for example, are (0.0, 0.1] (the moving speed is greater than 0.0 [m/s] and less than 0.1 [m/s]), (0.1, 0.2] (the moving speed is greater than 0.1 [m/s] and less than 0.2 [m/s]), and the like. In addition, also for the movement state information that represents a moving speed of 0 and no movement direction and does not belong to a direction cluster, a sum of "1/the number of movements" is taken. A value of a sum of "1/the number of movements" represents a person number ratio for a corresponding speed bin and a corresponding direction cluster.

Figure 4:
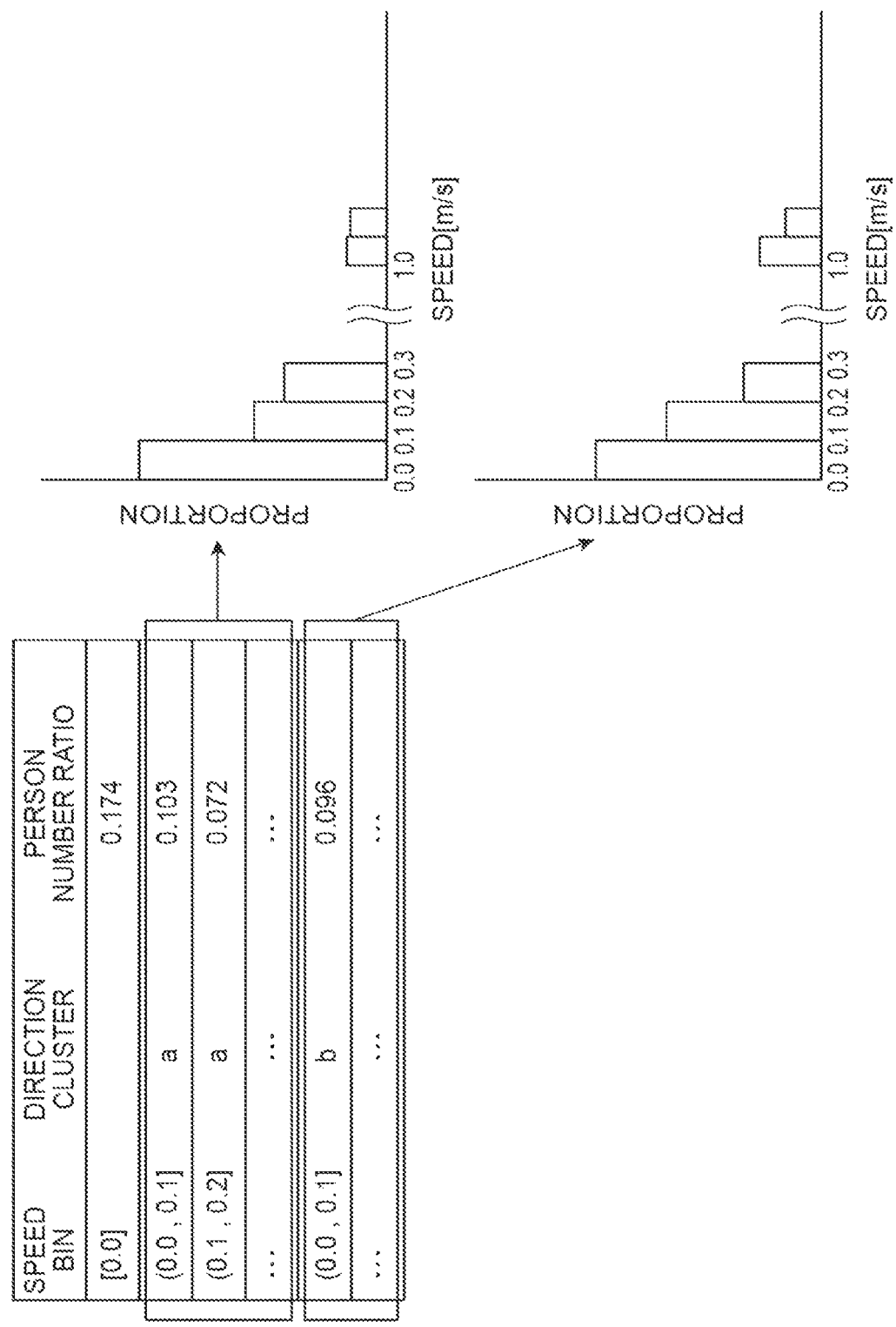
FIG. 4 is a diagram illustrating an example of a person number ratio for each speed bin and a direction cluster.

When the value of a sum of "1/the number of movements", that is, person number ratios is calculated for each of all the combinations of a speed bin and a direction cluster, the estimation unit 13 normalizes values of the person number ratios. As normalization, the estimation unit 13 divides the value of each person number ratio by the sum of values of the person number ratios before normalization such that the sum of the values of the person number ratios after normalization becomes 1. FIG. 4 illustrates information of person number ratios calculated in this way.

Figure 5:
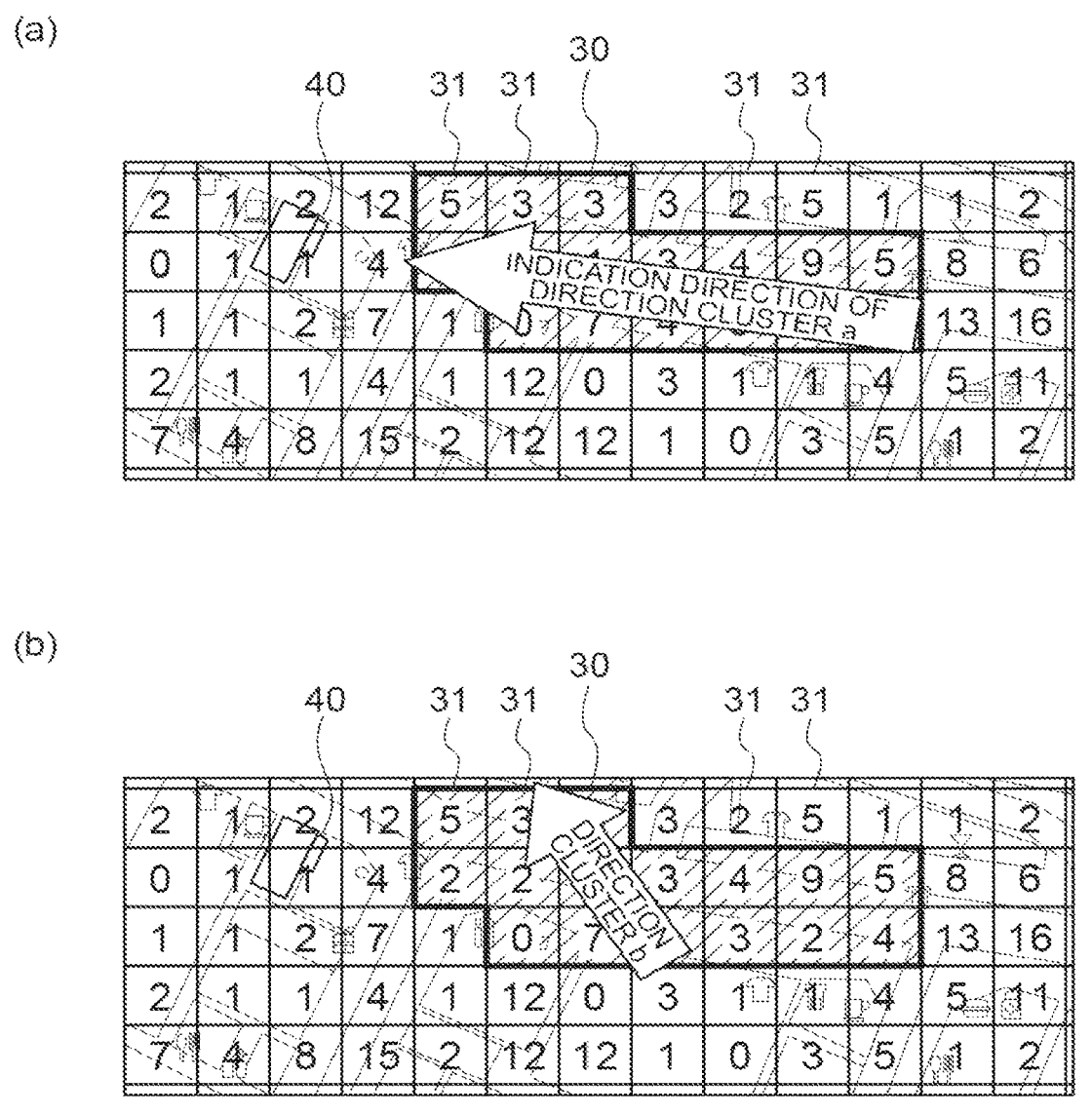

The estimation unit 13 calculates the number of mesh cells traversing the area 30 that is an estimation target for each direction cluster. For this reason, the estimation unit 13 calculates a direction (representing a direction cluster) for each direction cluster. For example, by taking an average of directions represented by the movement state information included in the direction cluster, the estimation unit 13 calculates the direction. In addition, the direction for each direction cluster may be calculated using a method other than that described above. The estimation unit 13 calculates a number for which the number of passed mesh cells 31 at the time of traversing the area 30 that is an estimation target through movement in the direction becomes a maximum. For example, in the case of a direction cluster a illustrated in FIG. 5(*a*), a maximum number of mesh cells becomes 8. In addition, in the case of a direction cluster b illustrated in FIG. 5(*b*), a maximum number of mesh cells becomes 5.

The estimation unit 13 calculates a traffic amount relating to one predetermined direction cluster on the basis of the information described above using the following equation.

[Math 1]

Traffic amount relating to $$\text{predetermined direction cluster} = \frac{3600}{lm} NS_v$$

In the equation described above, 3600 represents the number of seconds corresponding to one hour. l is the calculated maximum number of mesh cells. m is a size of the mesh cell 31 set in advance. In this embodiment, m is 7 [m]. N is a population of an area 30 that is an estimation target represented by population information. $S_v$ is a sum of products of values of the person number ratios and moving speeds corresponding to speed bins. For example, a moving speed corresponding to a speed bin may be set as a moving speed of an upper limit of the speed bin. For example, in the case of a speed bin of (0.0, 0.1], a moving speed corresponding to the speed bin is 0.1. Here, as a moving speed corresponding to a speed bin, a value other than that described above, for example, a median value of moving speeds of the speed bin, may be used. In this way, the estimation unit 13 estimates a traffic amount by multiplying a population number by a parameter (in the equation described above, $S_v$) according to a frequency of people for each movement state for each group. In addition, the estimation unit 13 estimates a traffic amount by multiplying a population number by a parameter (in the equation described above, 1/l) according to the movement direction of the area 30 that is an estimation target.

The estimation unit 13 calculates a traffic amount using the following equation for a speed bin of which a moving speed is 0.

Traffic amount for speed bin of which moving speed is $0 = Nr_{v0}$

In the equation represented above, $r_{v0}$ is a value of the person number ratio of the speed bin of which a moving speed is 0. A traffic amount in this case is the number of people who have continued to stay without moving in an area 30 that is an estimation target over a time frame that is an estimation target for the traffic amount.

The estimation unit 13 estimates a traffic amount of the entire area 30 that is an estimation target by taking a sum of the traffic amounts described above. The calculation of the traffic amount of the entire area can be represented using an equation as below.

$$\text{Traffic amount} = N\frac{3600}{m}\sum_c l_c^{-1}\sum_j v_{c\_i}r_{c\_i} + Nr_{v0} \qquad \text{[Math 2]}$$

In the equation represented above, c is an index that represents a speed cluster. $l_c$ is a maximum number of mesh cells calculated for the speed cluster c. i is an index of a speed bin. $v_{c\_i}$ is a moving speed corresponding to a speed cluster c and a speed bin i. $r_{c\_i}$ is a person number ratio for the speed cluster c and the speed bin i.

The process according to the function of the estimation unit 13 described above is performed at a timing set in advance. For example, the process is performed at a timing after the terminal 20 transmits location information. As described above, the process is performed at a time after the terminal 20 transmits location information at a time set in advance (for example, 0:00). Alternatively, the process may be performed in accordance with a trigger according to a manager or the like of the traffic amount estimation system 10. The acquisition of population information used for the process using the population information acquiring unit 11 may be performed before the process.

The estimation unit 13 outputs information representing the estimated traffic amount. For example, the information may be output to a display device included in the traffic amount estimation system 10 or may be output to another device, a module, or the like. By using the traffic amount estimated by the traffic amount estimation system 10, an advertising space can be evaluated. The function of the traffic amount estimation system 10 according to this embodiment has been described above.

Figure 6:
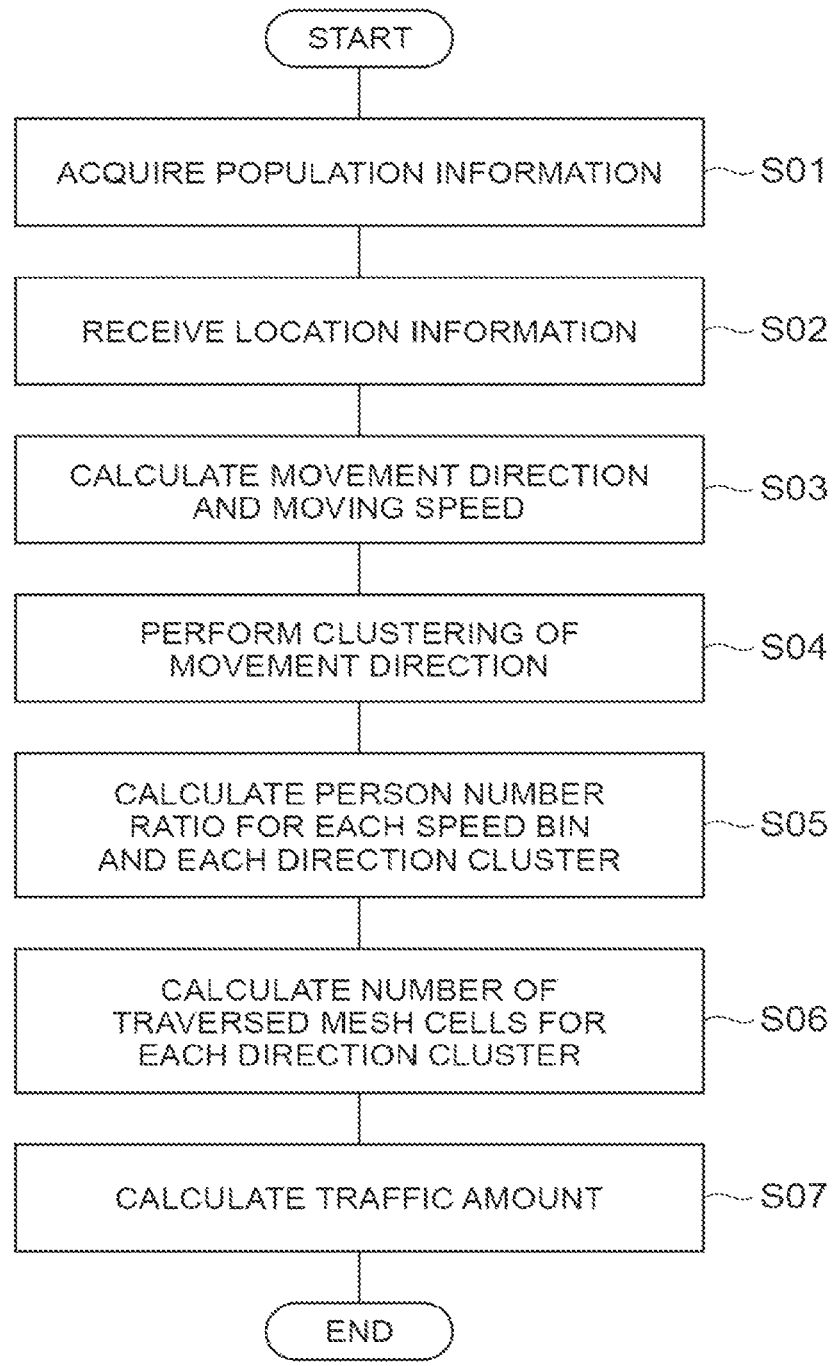
FIG. 6 is a flowchart illustrating a process executed by a traffic amount estimation system according to an embodiment of the present invention.

Next, the process performed by the traffic amount estimation system 10 according to this embodiment (an operation method performed by the traffic amount estimation system 10) will be described with reference to a flowchart illustrated in FIG. 6. In this process, population information representing a population at a predetermined timing in an area that is an estimation target is acquired by the population information acquiring unit 11 (S01). In addition, the acquisition of population information (S01) does not necessarily need to be performed first and may be performed before calculation of a traffic amount (S07) to be described below. Furthermore, location information transmitted from a plurality of terminals 20 is received by the movement state information acquiring unit 12 (S02). Subsequently, movement directions and moving speeds are calculated on the basis of the location information as movement state information by the movement state information acquiring unit 12 (S03).

Subsequently, clustering of the movement directions represented by the movement state information is performed by the estimation unit 13 (S04). Subsequently, a person number ratio for each speed bin and each direction cluster is calculated on the basis of the movement directions and the moving speeds calculated on the basis of the movement state information by the estimation unit 13 (S05). In addition, a maximum number of mesh cells traversing the area 30 that is the estimation target is calculated for each direction cluster by the estimation unit 13 (S06). Subsequently, a traffic amount is calculated and output on the basis of the person number ratio, the maximum number of mesh cells, the population information, and the like by the estimation unit 13 (S07). The process performed by the traffic amount estimation system 10 according to this embodiment is as described above.

In this embodiment, when population information is prepared in advance, or when population information is generated, by acquiring location information of some users, the traffic amount can be estimated. In addition, as described above, an appropriate traffic amount can be estimated with movement of users taken into account. Thus, for example, a traffic amount can be estimated without performing counting of a traffic amount at a specific place on a passage road, acquisition of location information of all the people over all the time frame for estimation in an area that is an estimation target, and the like. In addition, in this embodiment, it is only required to acquire population information and location information, and thus a traffic amount can be estimated without requiring costs for installation of cameras and the like. In other words, according to this embodiment, a traffic amount can be estimated easily and appropriately.

In addition, as in the embodiment described above, a traffic amount may be estimated by multiplying the population number represented by the population information by a parameter according to a frequency of people (for example, $S_v$ described above) for each movement state of each group. Furthermore, a traffic amount may be estimated by multiplying the population number by a parameter according to a moving direction of the area that is an estimation target (for example, 1/1 described above). According to such a configuration, a traffic amount can be estimated appropriately and reliably. However, according to an embodiment of the present invention, such parameters do not necessarily need to be used as long as grouped movement state information and population information are used.

In addition, as in the embodiment described above, movement directions and moving speeds may be calculated as movement state information on the basis of location information of a plurality of users. According to such a configuration, movement state information can be acquired appropriately and reliably, and a traffic amount can be estimated appropriately and reliably. Here, as movement state information, the movement state information described above does not need to be used, and any movement state information may be used as long as the movement state information is information that represents movement states of users and can be used for estimating a traffic amount.

In addition, in the embodiment described above, attributes (for example, sex, age, and hobbies and tastes) of users are not taken into account. However, in a case in which population information and location information for each attribute of users can be acquired, for example, in a case in which information associated with demographic data can be acquired, a traffic amount for each attribute of users may be estimated. By estimating a traffic amount for each attribute of users, an advertising space for each attribute of users can be evaluated.

In the embodiment described above, estimation of a traffic amount has been described to be used for evaluating an advertising space. However, the traffic amount estimation system 10 may be configured to estimate a traffic amount for an arbitrary purpose other than evaluation of an advertising space. In such a case, an area 30 that is an estimation target may be appropriately configured for the purpose.

Each block diagram used for description of the embodiment described above illustrates blocks in units of functions. Such functional blocks (component units) are realized by an arbitrary combination of at least one of hardware and software. In addition, a method for realizing each functional block is not particularly limited. In other words, each functional block may be realized by one device that is combined physically or logically or a plurality of devices by directly or indirectly (for example, using a wire, wirelessly, or the like) connecting two or more devices separated physically or logically. A functional block may be realized by combining software with one device or the plurality of devices described above.

As functions, there are deciding, determining, judging, computing, calculating, processing, deriving, inspecting, searching, checking, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like, and the functions are not limited thereto. For example, a functional block (constituent unit) enabling transmitting is referred to as a transmitting unit or a transmitter. As described above, a method for realizing all the functions is not particularly limited.

Figure 7:
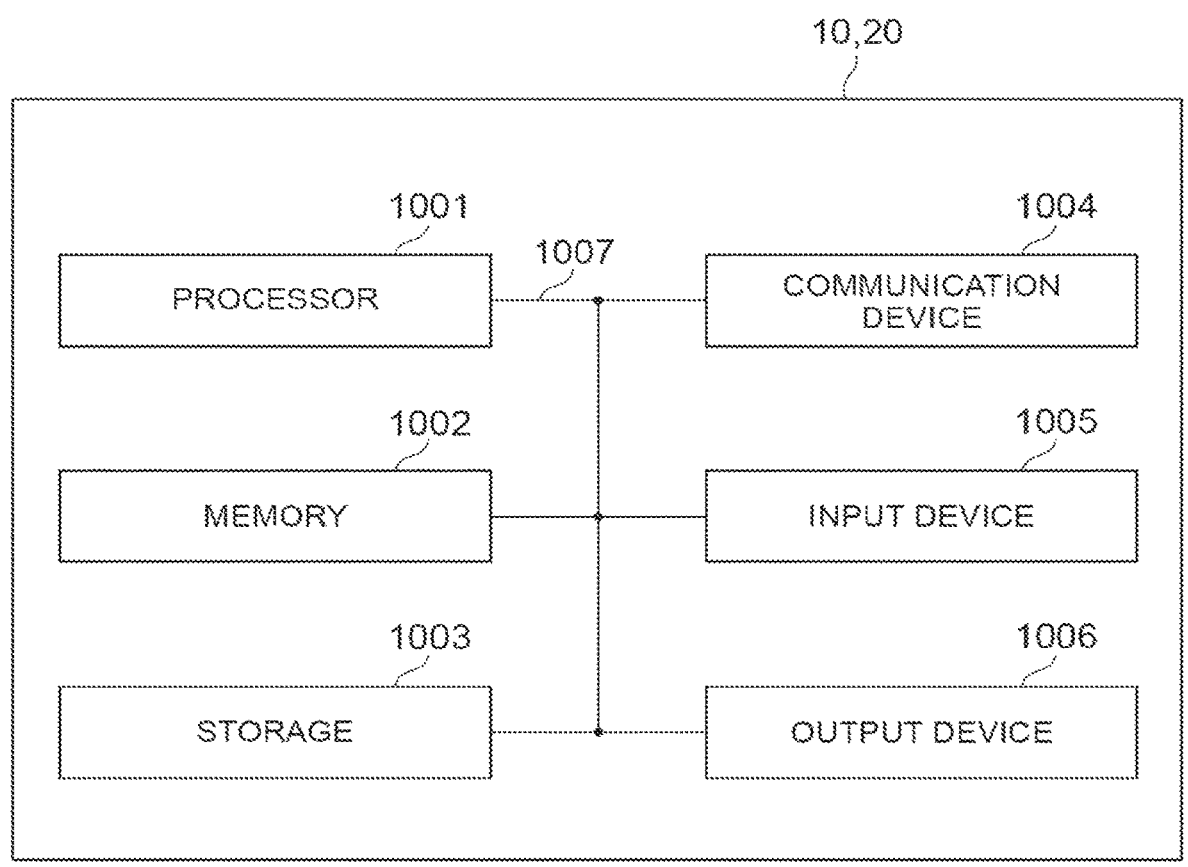
FIG. 7 is a diagram illustrating the hardware configuration of a traffic amount estimation system according to an embodiment of the present invention.

For example, the traffic amount estimation system 10 according to one embodiment of the present disclosure may function as a computer that performs the process of the method of the present disclosure. FIG. 7 is a diagram illustrating one example of the hardware configuration of the traffic amount estimation system 10 according to one embodiment of the present disclosure. The traffic amount estimation system 10 described above, physically, may be configured as a computer device including a processor 1001, a memory 1002, a storage 1003, a communication device 1004, an input device 1005, an output device 1006, a bus 1007, and the like. In addition, the terminal 20 according to this embodiment may have a hardware configuration that is similar to that of the present description.

In addition, in the following description, a term "device" may be rephrased as a circuit, a device, a unit, or the like. The hardware configuration of the traffic amount estimation system 10 may be configured to include one or a plurality of devices illustrated in the drawing and may be configured without including some of these devices.

Each function of traffic amount estimation system 10 may be realized when the processor 1001 performs an arithmetic operation by causing predetermined software (a program) to be read onto hardware such as the processor 1001, the memory 1002, and the like, controls communication using the communication device 1004, and controls at least one of data reading and data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, each function of the traffic amount estimation system 10 described above may be realized by the processor 1001.

In addition, the processor 1001 reads a program (program code), a software module, data, and the like from at least one of the storage 1003 and the communication device 1004 into the memory 1002 and executes various processes in accordance with these. As the program, a program causing a computer to execute at least some of the operations described in the embodiment described above is used. For example, each function of the traffic amount estimation system 10 may be realized by a control program that is stored in the memory 1002 and operated by the processor 1001. Although the various processes described above have been described as being executed by one processor 1001, the processes may be executed simultaneously or sequentially by two or more processors 1001. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable for performing the method according to one embodiment of the present disclosure.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including at least one of the memory 1002 and a storage 1003, a server, or any other appropriate medium.

The communication device 1004 is hardware (a transmission/reception device) for performing inter-computer communication through at least one of a wired network and a wireless network and, for example, may be called also a network device, a network controller, a network card, a communication module, or the like. For example, each function of the traffic amount estimation system 10 described above may be realized by the communication device 1004.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or buses different between devices.

In addition, the traffic amount estimation system 10 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components.

The processing sequence, the sequence, the flowchart, and the like of each aspect/embodiment described in the present disclosure may be changed in order as long as there is no contradiction. For example, in a method described in the present disclosure, elements of various steps are presented in an exemplary order, and the method is not limited to the presented specific order.

The input/output information and the like may be stored in a specific place (for example, a memory) or managed using a management table. The input/output information and the like may be overwritten, updated, or added to. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in the present disclosure may be individually used, used in combination, or be switched therebetween in accordance with execution. In addition, a notification of predetermined information (for example, a notification of being X) is not limited to being performed explicitly and may be performed implicitly (for example, a notification of the predetermined information is not performed).

As above, while the present disclosure has been described in detail, it is apparent to a person skilled in the art that the present disclosure is not limited to the embodiments described in the present disclosure. The present disclosure may be modified or changed without departing from the concept and the scope of the present disclosure set in accordance with the claims. Thus, the description presented in the present disclosure is for the purpose of exemplary description and does not have any limited meaning for the present disclosure.

It is apparent that software, regardless of whether it is called software, firmware, middleware, a microcode, a hardware description language, or any other name, may be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, information, and the like may be transmitted and received via a transmission medium. For example, in a case in which software is transmitted from a website, a server, or any other remote source using at least one of a wiring technology such as a coaxial cable, an optical fiber cable, a twisted pair, a digital subscriber line (DSL) or the like and a radio technology such as infrared rays, radio waves, microwaves, or the like, at least one of such a wiring technology and a radio technology is included in the definition of the transmission medium.

Information, a signal, and the like described ill the present disclosure may be represented using any one among other various technologies. For example, data, a direction, a command, information, a signal, a bit, a symbol, a chip, and the like described over the entire description presented above may be represented using a voltage, a current, radio waves, a magnetic field or magnetic particles, an optical field or photons, or an arbitrary combination thereof.

Furthermore, terms described in the present disclosure and terms that are necessary for the understanding of the present disclosure may be substituted with terms having the same or similar meanings. For example, at least one of a channel and a symbol may be a signal (signaling). In addition, a signal may be a message.

In addition, information, a parameter, and the like described in the present disclosure may be represented using absolute values, relative values from predetermined values, or other corresponding information.

The names used for the parameters described above are not limited names in any aspect. In addition, equations and the like using such parameters may be different from those that are explicitly disclosed in the present disclosure.

Terms such as "determining" used in the present disclosure may include various operations of various types. The "deciding" and "determining", for example, may include a case in which judging, calculating, computing, processing, deriving, investigating, looking up, search, and inquiry (for example, looking up a table, a database, or any other data structure), or ascertaining is regarded as "deciding" and "determining". In addition, "deciding" and "determining" may include a case in which receiving (for example, receiving information), transmitting (for example, transmitting information), input, output, or accessing (for example, accessing data in a memory) is regarded as "deciding: and "determining". Furthermore, "deciding" and "determining" may include a case in which resolving, selecting, choosing, establishing, comparing, or the like is regarded as "deciding" and "determining". In other words, "deciding" and "determining" includes a case in which a certain operation is regarded as "deciding" and "determining". In addition, "deciding (determining)" may be rephrased with "assuming", "expecting", "considering", and the like.

Terms such as "connected" or "coupled" or all the modifications thereof mean all the kinds of direct or indirect connection or coupling between two or more elements and may include presence of one or more intermediate elements between two elements that are mutually "connected" or "coupled". Coupling or connection between elements may be physical coupling or connection, logical coupling or connection, or a combination thereof. For example, "connection" may be rephrased with "access". When used in the present disclosure, two elements may be considered as being mutually "connected" or "coupled" by using one or more wires and at least one of a cable and a print electric connection and, as several non-limiting and non-comprehensive examples, by using electromagnetic energy such as electromagnetic energy having wavelengths in a radio frequency region, a microwave region, and a light (both visible light and non-visible light) region.

Description of "on the basis of" used in the present disclosure does not mean "only on the basis of" unless otherwise mentioned. In other words, description of "on the basis of" means both "only on the basis of" and "on the basis of at least."

In the present disclosure, in a case in which names such as "first", "second", and the like is used, referring to each element does not generally limit the amount or the order of such an element. Such names may be used in the present disclosure as a convenient way for distinguishing two or more elements from each other. Accordingly, referring to the first and second elements does not mean that only the two elements are employed therein or the first element should precede the second element in a certain form.

In a case in which "include," "including," and modifications thereof are used in the present disclosure, such terms are intended to be inclusive like a term "comprising." In addition, a term "or" used in the present disclosure is intended to be not an exclusive logical sum.

In the present disclosure, for example, in a case in which an article such as "a," "an," or "the" in English is added through a translation, the present disclosure may include a plural form of a noun following such an article.

In the present disclosure, a term "A and B are different" may means that "A and B are different from each other". In addition, the term may mean that "A and B are different from C". Terms "separated", "combined", and the like may be interpreted similar to "different".

REFERENCE SIGNS LIST

10 Traffic amount estimation system
11 Population information acquiring unit
12 Movement state information acquiring unit
13 Estimation unit
20 Terminal
1001 Processor
1002 Memory
1003 Storage
1004 Communication device

1005 Input device
1006 Output device
1007 Bus

The invention claimed is:

1. A traffic amount estimation system that estimates a traffic amount of people in a predetermined time frame in an area that is an estimation target set in advance, the traffic amount estimation system comprising circuitry configured to:
   acquire population information representing a population at a predetermined timing in the area that is the estimation target;
   acquire movement state information representing a movement state of each of a plurality of people in the area that is the estimation target, the movement state including at least a speed and direction of each of the plurality of people in the area; and
   group the movement state information in accordance with the speed and direction of each of the plurality of people in the area, such that a plurality of speed groups and direction groups are generated, and
   calculate, for each direction group, a number for which a number of passed mesh cells in the area that is the estimation target becomes a maximum,
   wherein the circuitry estimates the traffic amount for each direction group by multiplying the population number by (i) a parameter according to a movement direction of the area that is the estimation target group and (ii) a quotient of a target time divided by a maximum distance traversed the direction group, the maximum distance being based on the calculated maximum number of passed mesh cells and a predetermined size of a mesh cell.

2. The traffic amount estimation system according to claim 1, wherein the circuitry acquires location information representing a location of each of the plurality of people and calculates the direction and the speed on the basis of the location information.

* * * * *